US012754042B2

(12) United States Patent
Kurz et al.

(10) Patent No.: US 12,754,042 B2
(45) Date of Patent: Oct. 6, 2026

(54) INDUCTIVE POSITION SENSOR FOR SMALL APPLICATIONS

(71) Applicants: BOSCH CAR MULTIMEDIA PORTUGAL, S.A., Braga (PT); UNIVERSIDADE DO MINHO, Braga (PT)

(72) Inventors: Andreas Kurz, Heilbronn (DE); Débora Pereira, Vila Nova de Gaia (PT); Jorge Cabral, Guimarães (PT); José António Azevedo Gonçalves, Arcozelo BCL (PT); Robert Alexander Dauth, Abstatt (DE); Sina Fella, Neuenstadt (DE); Tim Krzyzanowski, Abstatt (PT); Ville Samuli Kivijarvi, Braga (PT)

(73) Assignees: BOSCH CAR MULTIMEDIA PORTUGAL, S.A., Braga (PT); UNIVERSIDADE DO MINHO, Braga (PT)

( * ) Notice: Subject to any disclaimer, the term of this patent is extended or adjusted under 35 U.S.C. 154(b) by 250 days.

(21) Appl. No.: 18/686,213

(22) PCT Filed: Sep. 14, 2021

(86) PCT No.: PCT/IB2021/058357
§ 371 (c)(1),
(2) Date: Mar. 26, 2024

(87) PCT Pub. No.: WO2023/037152
PCT Pub. Date: Mar. 16, 2023

(65) Prior Publication Data
US 2024/0369382 A1 Nov. 7, 2024

(30) Foreign Application Priority Data
Sep. 10, 2021 (PT) ........................................ 117451

(51) Int. Cl.
*G01D 5/20* (2006.01)

(52) U.S. Cl.
CPC ...................................... *G01D 5/20* (2013.01)

(58) Field of Classification Search
CPC ....... G01D 5/20; G01D 5/2053; G01D 5/2046
See application file for complete search history.

(56) References Cited

U.S. PATENT DOCUMENTS

2006/0001518 A1 1/2006 Hayashi et al.
2013/0057267 A1* 3/2013 Klein .................... H05K 1/165 324/234

(Continued)

FOREIGN PATENT DOCUMENTS

CN 107796293 B 10/2019

OTHER PUBLICATIONS

International Search Report and Written Opinion for Corresponding International Application No. PCT/IB2021/058357, 9 pages, May 23, 2022.

*Primary Examiner* — Akm Zakaria
(74) *Attorney, Agent, or Firm* — LUCAS & MERCANTI, LLP

(57) ABSTRACT

An inductive positioning sensor (100) for small electrical and electronic applications that allows to achieve a higher induced voltage output. The inductive positioning sensor (100) is arranged in a multi-layer printed circuit board, that comprises an excitation coil (1) and at least one receiver coil A (2) and a corresponding duplicated receiver coil A (22), where the excitation coil circularly surrounds the limits defined by the at least one receiver coil A (2) and the corresponding duplicated receiver coil A (22). The at least one receiver coil A (2) comprises a main convergence point (106) and at least one auxiliary convergence point (104), and the corresponding duplicated receiver coil A (22) comprises at least one auxiliary convergence point (104). The at least (Continued)

one receiver coil A (2) and the corresponding duplicated receiver coil A (22) merge together in a secondary convergence point (104).

8 Claims, 6 Drawing Sheets

(56) References Cited

U.S. PATENT DOCUMENTS

| | | | | |
|---|---|---|---|---|
| 2019/0360839 | A1* | 11/2019 | Shao | H03K 17/97 |
| 2020/0018620 | A1* | 1/2020 | Hayashi | G01D 18/00 |
| 2020/0064158 | A1 | 2/2020 | Lee et al. | |
| 2021/0190543 | A1* | 6/2021 | Ausserlechner | G01D 5/204 |

* cited by examiner

INDUCTIVE POSITION SENSOR FOR SMALL APPLICATIONS

CROSS-REFERENCE TO RELATED APPLICATIONS

This application is a 371 of PCT/IB2021/058357, filed Sep. 14, 2021, which claimed the priority of Portuguese Patent Application No. 117451, filed Sep. 10, 2021, the contents of each of which are incorporated herein by reference.

TECHNICAL FIELD

The present application describes an inductive positioning sensor.

BACKGROUND ART

Inductive position sensors are usually used to measure the positioning of a moving target. From known technical art, there are several approaches with regard to the operating principles of inductive sensors. The sensor herein disclosed uses the principle of coupled coils.

Inductive position sensors based on coupled coils typically are constituted by one excitation coil and one receiver system, that can comprise two or three coils. These coils are part of the PCB Sensor, which also includes an application-specific integrated circuit (ASIC).

This ASIC is needed for the excitation of the transceiver coil and the demodulation/amplification of the induced voltage signals on the receivers.

The signal shape and amplitude of the induced voltage is mainly affected by the spanned area of the receiver coils, the airgap between sensor and target and the target position. Since the airgap and the shape of the receiver coil is considered to be approximately constant, the induced voltage signal gives information about the target position.

Small inductive position sensors typically have a low signal-to-noise ratio, because of their lower output. Therefore, the size of the sensor cannot be downscaled to a level required for some potential applications. Present application discloses a solution for the above-mentioned limitation, and in order to overcome it, a new concept is used, based on stacked and nested coils with variable sizes.

SUMMARY

Present invention describes an inductive positioning sensor, arranged in a multi-layer printed circuit board, comprising at least one excitation coil; and at least one receiver coil system, comprising at least two interlaced receiver coils arranged on different layers in a mirrored shaped geometry; wherein the at least two interlaced receiver coils are connected in series by a single connection point arrangement of three through-hole vias.

In a proposed embodiment, the at least one excitation coil circularly surrounds the limits defined by the at least one receiver coil system.

In another possible embodiment, each of the at least two interlaced receiver coils comprise at least one receiver coil A and a corresponding duplicated receiver coil A.

In another possible embodiment, the at least one receiver coil A comprises a higher induced voltage.

In another proposed embodiment, the at least one receiver coil A comprises a main convergence point and at least one auxiliary convergence point.

In another proposed embodiment, the multi-layer printed circuit board comprises traces and at least four overlapped layers.

In another possible embodiment, the trace layout comprises at least two stacked traces in different overlapped layers.

In another possible embodiment, the main convergence point comprises three convergence points: convergence point A, convergence point B and convergence point C.

In another possible embodiment, the convergence points are adapted to route and de-interlace the stacked traces between each other along the at least on the four layers of the printed circuit board.

In another possible embodiment, the convergence point A comprises a through-hole via connection between the layers of the printed circuit board, said via being adapted to allow the trace communication between top layer and bottom layer.

In another possible embodiment, the convergence point B comprises a through-hole via connection between the layers of the printed circuit board, said via being adapted to allow the trace communication between top layer, bottom layer, and between intermediate layer one and layer three.

In another possible embodiment, the convergence point C comprises a through-hole via connection between the layers of the printed circuit board, said via being adapted to allow the trace communication between top layer, bottom layer and intermediate layer two.

In another possible embodiment, the at least one auxiliary convergence point comprises blind vias.

In another possible embodiment, the secondary convergence point comprises two opposite auxiliary convergence points forming an independent cross shaped connection between stacked traces.

In another possible embodiment, the inductive positioning sensor comprises an application-specific integrated circuit with at least two interlaced receiver coils connected per-channel.

General Description

The present application describes an inductive position sensor for small applications that allows to achieve a higher induced voltage output. To accomplish this result, it is necessary to increase the total area of the receiver coils of the sensor, once the induced voltage created by Eddy currents is proportional to said area. Once the space for the sensor development is mostly limited by the final application, this can be achieved by placing the receiver coils on at least four separated Printed Circuit Board (PCB) layers. In case of a PCB, this means limited dimensions in x-axis and y-axis direction of one layer.

Since the amplitude of the induced voltage signal depends on the geometry of the receiver coil, the signal-to-noise-ratio (SNR) is always in conflict with the available dimensions. Smaller sensors typically have a lower SNR, because of their lower output. Therefore, the size of the sensor cannot be downscaled to a level for required some potential applications.

Instead of using just one receiver coil for one input-channel, on the proposed disclosure, the ASIC resorts to the use of at least two coils per input-channel. The coils are connected in series, which means that for two coils with identical induced voltage levels, the total output voltage will be doubled. This design requires more PCB layers, multi-layer PCB, because the coils for one input-channel need to be "stacked" in height (z-axis direction).

With the proposed coil arrangement, an additional gain factor of approximately the double of the original signal is achieved, mainly due to the additional arrangement of two layers below the original receiver coils. The original signal is not doubled, as the second part of the receiver coil is placed further away of the target, leading to lower induced fields.

The increase of the coil area is achieved by duplicating the receiver coils, placing the duplicates under or over the original coils and then connecting said coils in series.

With the proposed technology, it is also possible to design different coils of different sizes and shapes and connect them in series to increase the induced voltage. This design has the advantage that no blind vias are needed, leading to a cost reduction compared to known layouts. The same principle can also be achieved with a higher number of coils. The proposed invention can be used for both, rotor positioning as well as linear position sensors.

BRIEF DESCRIPTION OF THE DRAWINGS

For better understanding of the present application, figures representing preferred embodiments are herein attached which, however, are not intended to limit the technique disclosed herein.

100—inductive position sensor;
1—Excitation Coil;
2—Receiver coil A;
22—Duplicated Receiver coil A;
3—Receiver coil B;
33—Duplicated Receiver coil B.

Figure 2:
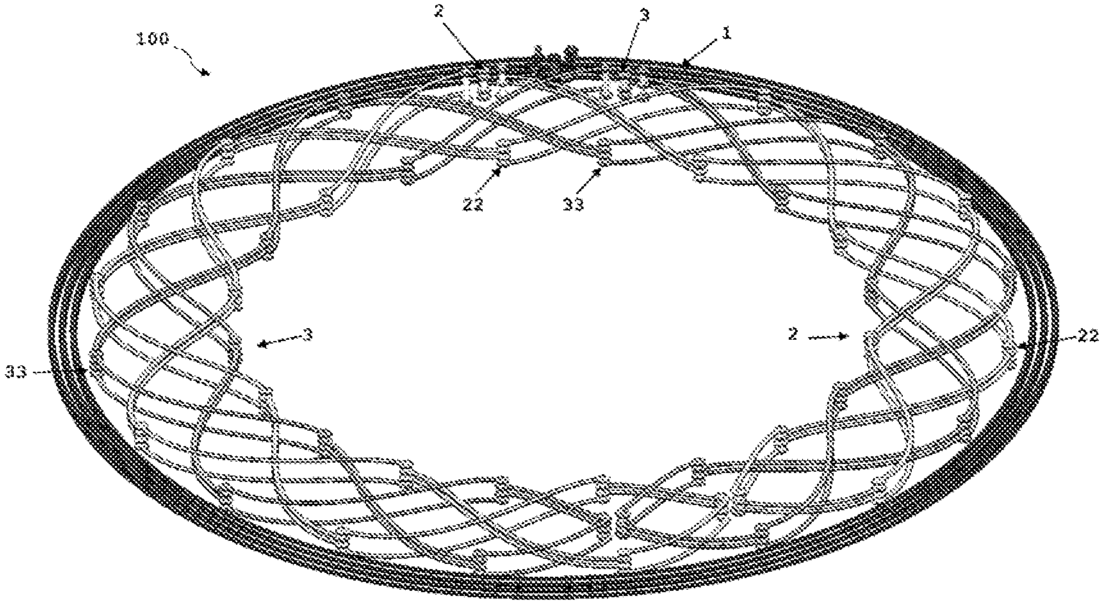

FIG. 2—represents a perspective view of the proposed inductive position sensor (100) with two duplicated receiver coils. Reference numbers represent:

100—inductive position sensor;
1—Excitation Coil;
2—Receiver coil A;
22—Duplicated Receiver coil A;
3—Receiver coil B;
33—Duplicated Receiver coil B.

Figure 3:
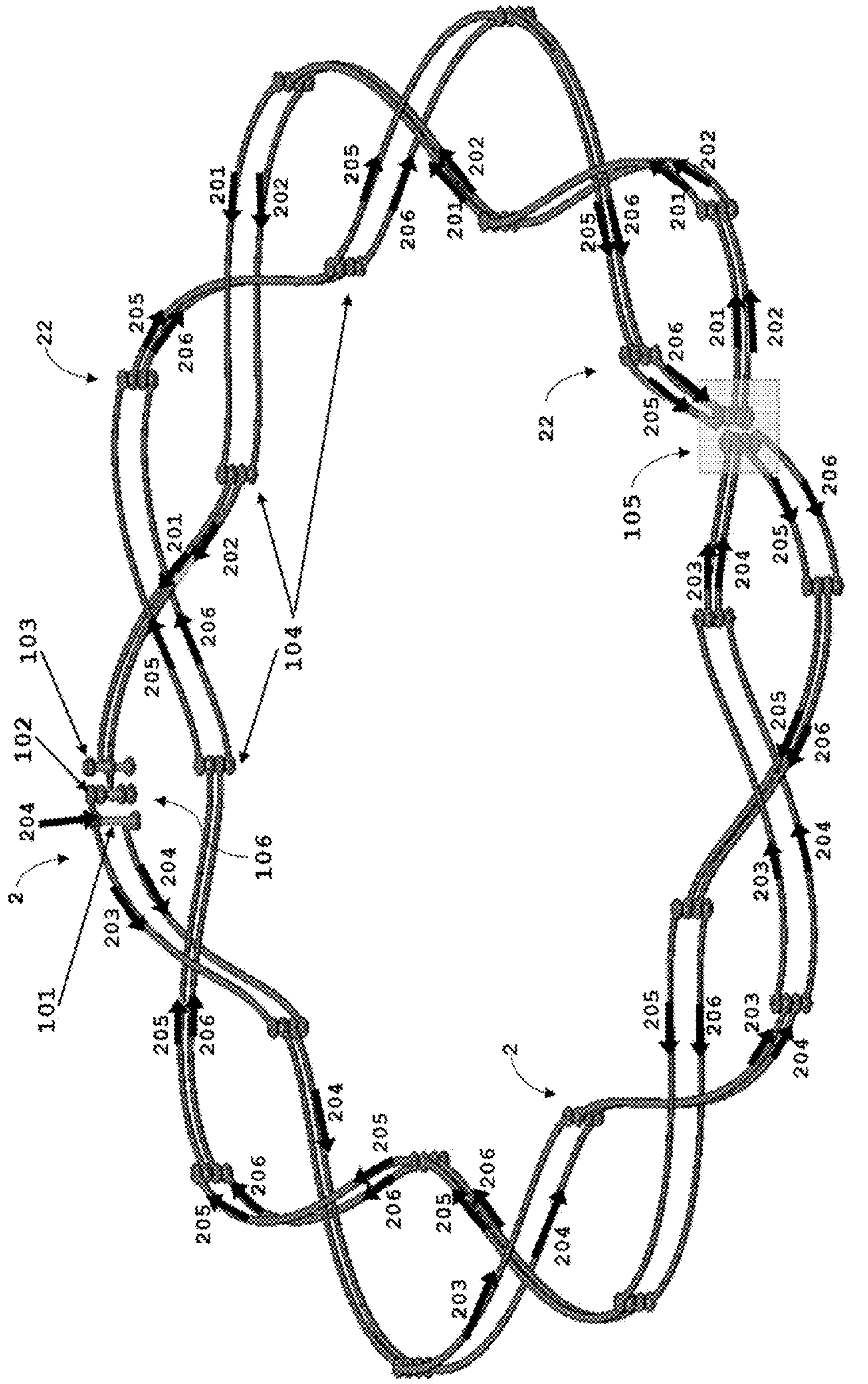

FIG. 3—represents a perspective view of the proposed inductive position sensor (100) with a duplicated receiver coil were the arrows show the current flow. This figure mainly represents the interlaced layout of Receiver coil A (2) and the Duplicated Receiver coil A (22), where the square zone enlightenment indicates one of the connection points, and from where the coil is connected to the ASIC. Reference numbers represent:

2—Receiver coil A;
22—Duplicated Receiver coil A;
101—PCB through-hole via/convergence point A;
102—PCB through-hole via/convergence point B;
103—PCB through-hole via/convergence point C;
104—PCB blind vias/auxiliary convergence point;
105—PCB blind vias/secondary convergence point/current flow turning point;
106—PCB vias/main convergence point;
201—receiver coil A current flow path A;
202—receiver coil A current flow path B;
203—receiver coil A current flow path C;
204—receiver coil A current flow path D;
205—duplicated receiver coil A current flow path E;
206—duplicated receiver coil A current flow path F.

Figure 4:
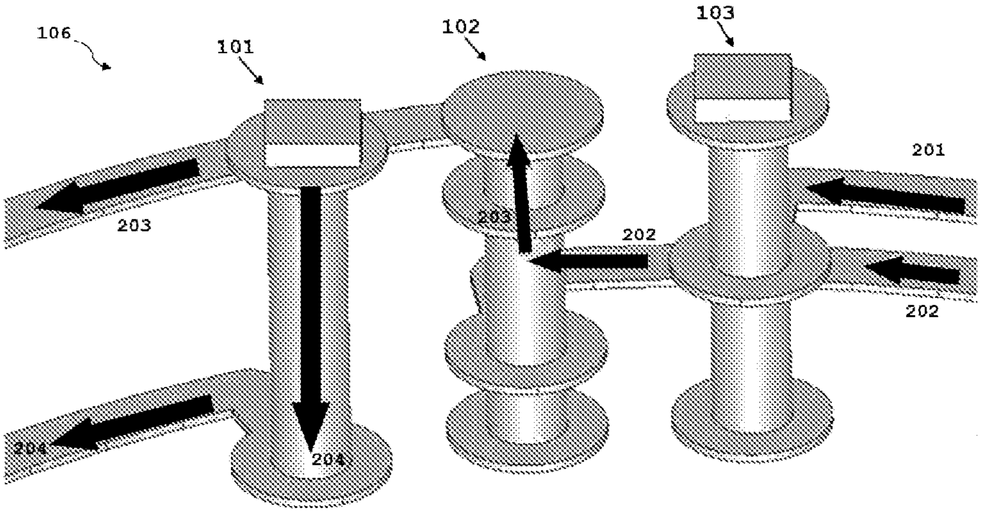

FIG. 4—represents a zoomed view perspective of the proposed inductive position sensor (100) with a duplicated receiver coil in a via connection place. In this convergence point (106) it is represented:

101—PCB through-hole via/convergence point A;
102—PCB through-hole via/convergence point B;
103—PCB through-hole via/convergence point C;
106—PCB vias/main convergence point;
201—receiver coil A current flow path A;
202—receiver coil A current flow path B;
203—receiver coil A current flow path C;
204—receiver coil A current flow path D.

Figure 5:
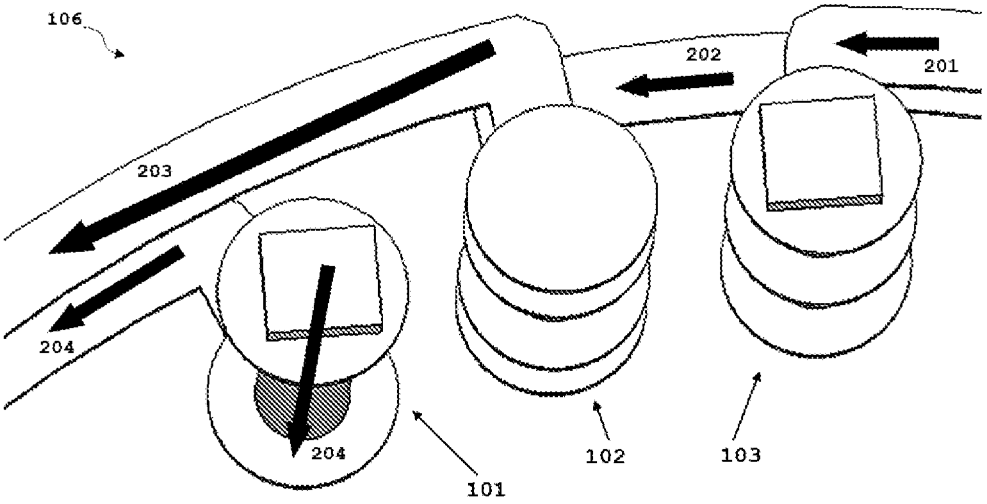

FIG. 5—represents another zoomed view perspective of the proposed inductive position sensor (100) with a duplicated receiver coil in a via connection place. In this convergence point (106) it is represented:

101—PCB through-hole via/convergence point A;
102—PCB through-hole via/convergence point B;
103—PCB through-hole via/convergence point C;
106—PCB vias/main convergence point;
201—receiver coil A current flow path A;
202—receiver coil A current flow path B;
203—receiver coil A current flow path C;
204—receiver coil A current flow path D.

Figure 6:
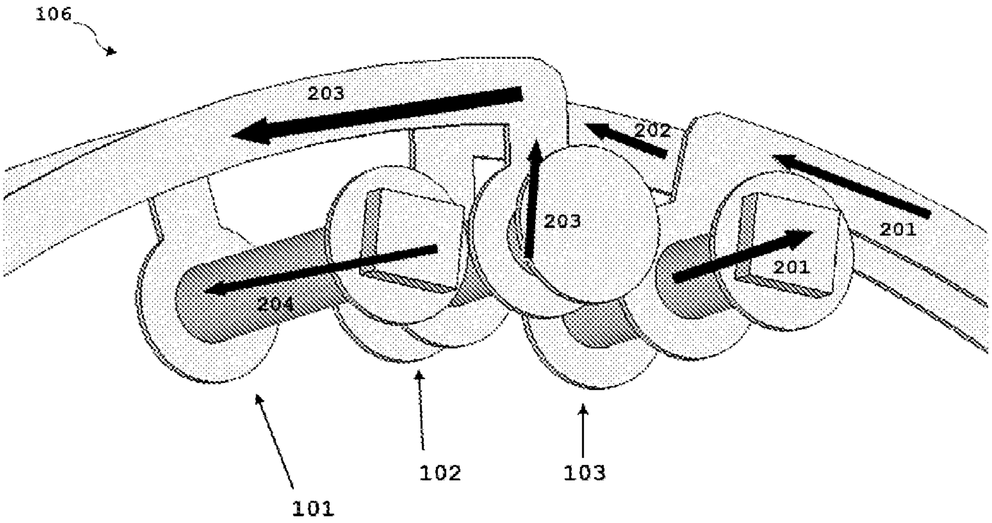

FIG. 6—represents another zoomed view perspective of the proposed inductive position sensor (100) with a duplicated receiver coil in a via connection place. In this convergence point (106) it is represented:

101—PCB through-hole via/convergence point A;
102—PCB through-hole via/convergence point B;
103—PCB through-hole via/convergence point C;
106—PCB vias/main convergence point;
201—receiver coil A current flow path A;
202—receiver coil A current flow path B;
203—receiver coil A current flow path C;
204—receiver coil A current flow path D.

Figure 7:
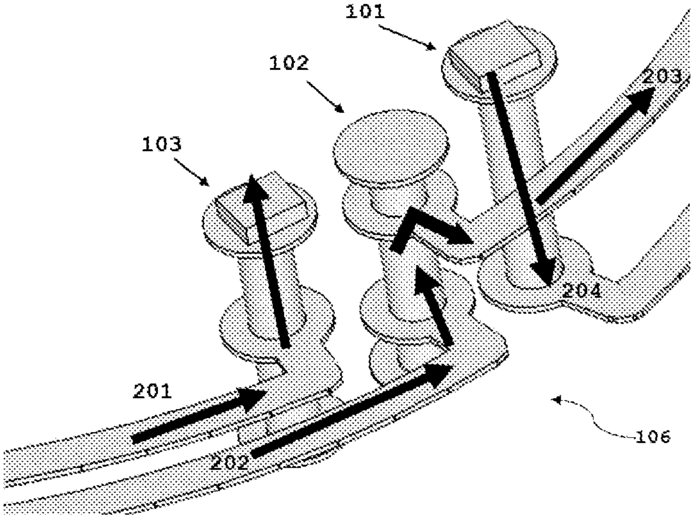

FIG. 7—represents another zoomed view perspective of the proposed inductive position sensor (100) with a duplicated receiver coil in a via connection place. In this convergence point (106) it is represented:

101—PCB through-hole via/convergence point A;
102—PCB through-hole via/convergence point B;
103—PCB through-hole via/convergence point C;
106—PCB vias/main convergence point;
201—receiver coil A current flow path A;
202—receiver coil A current flow path B;
203—receiver coil A current flow path A;
204—receiver coil A current flow path B.

Figure 8:
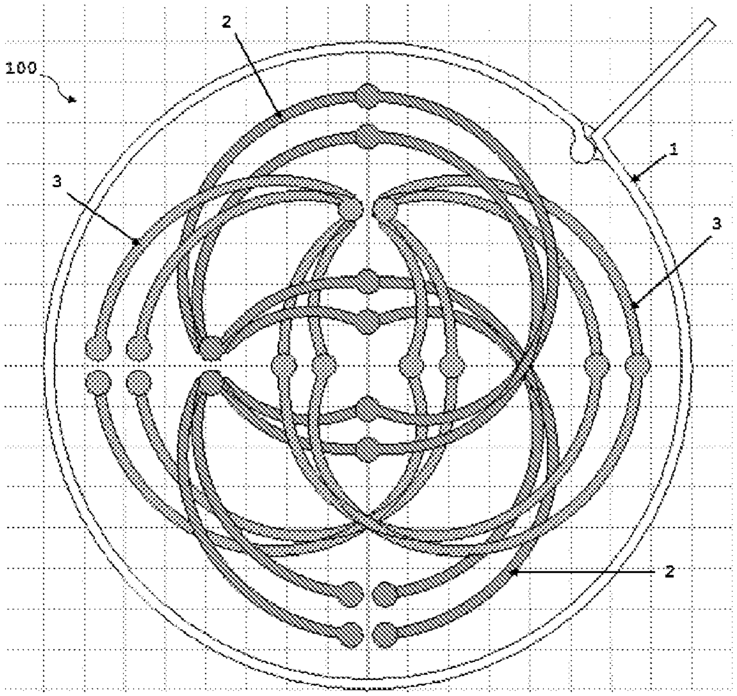

FIG. 8—represents an alternative sensor arrangement with no buried or blind vias (100). With this layout, coils will present different diameters, which can allow the creation of more than one RX Coil with through-hole vias. In this case the doubled coils are connected in series to increase induced voltage. The picture shows exemplarily a 1-fold symmetry. Reference numbers represent:

1—Excitation Coil;
2—Receiver coil A;
3—Receiver coil B.

Figure 9:
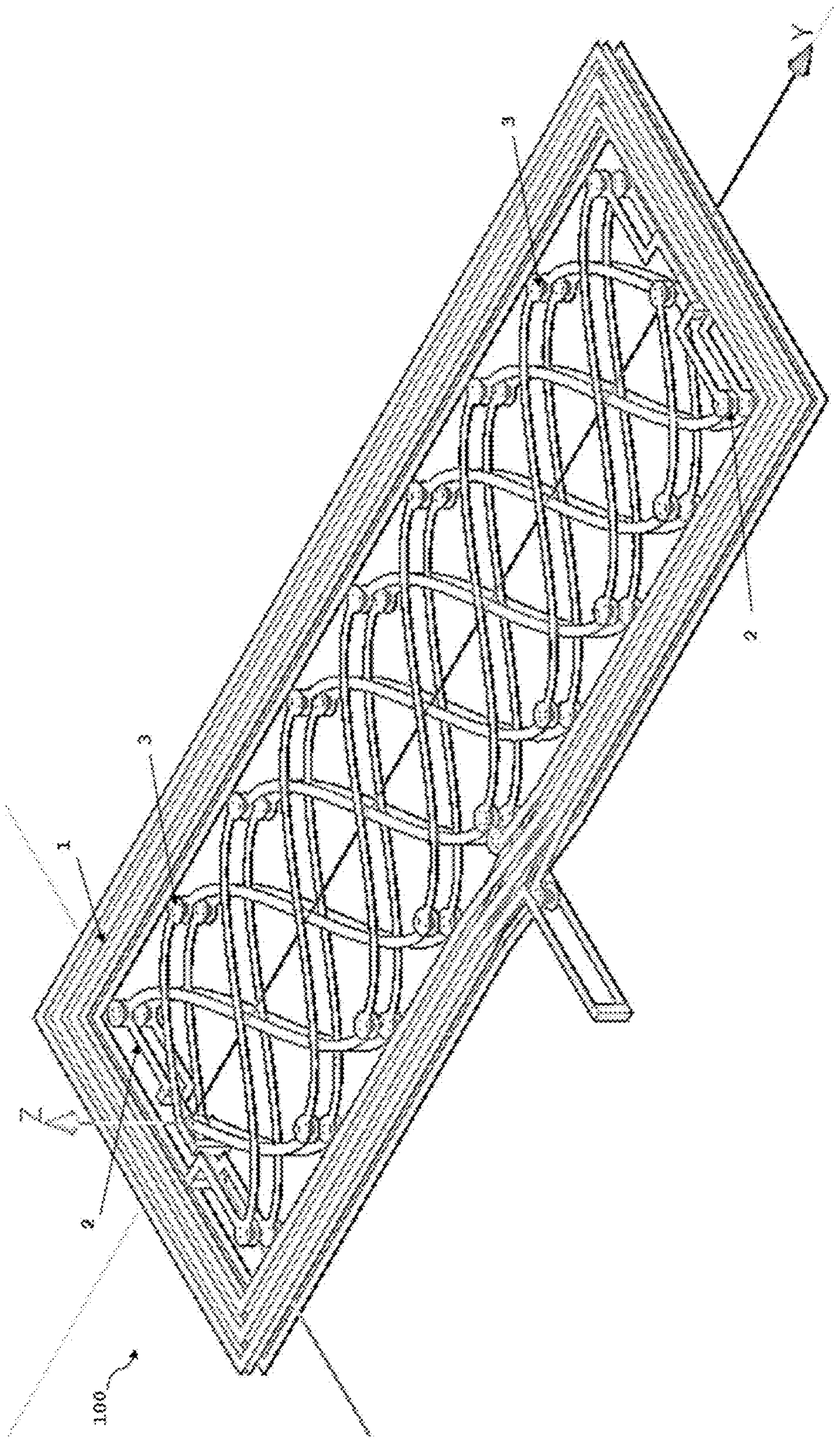

FIG. 9—is representative of an example of an alternative linear position sensor (100). Reference numbers represent:

1—Excitation Coil;
2—Receiver coil A;
3—Receiver coil B.

DESCRIPTION OF EMBODIMENTS

With reference to the figures, some embodiments are now described in more detail, which are however not intended to limit the scope of the present application.

The present application describes an inductive positioning sensor (100), based on the use of a multi-layered PCB, which comprises a excitation coil (1) and at least a receiver coil A (2) and a receiver coil B (3), that allows to achieve a higher induced voltage output through the increase of the coil area provided by the receiver coils (2, 3).

This area increase is achieved through the use of a specific designed layout of the vias and traces on a multi-layered PCB with at least four layers. This trace and via layout, allows to have more than one receiver coil in the same sensor in an overlapped arrangement. Therefore, and to achieve an increased output voltage, beyond the main convergence point (106), which comprises three convergence points (101, 102, 103) or through-hole vias, were the induced currents flow (201, 202, 203, 204) meet and are reappointed to other adjacent layers, there are other important convergence points that allow the interlacement of the laid out coils and their induced currents, namely the auxiliary convergence point (104) and the secondary convergence point (105). The auxiliary convergence points (104) allow to bypass the flow currents between adjacent traces that are horizontally arranged and vertically aligned, located in intermediate layers of the sandwich PCB, to upper and lower traces, and vice versa. This means that the auxiliary convergence points (104), or blind vias, allow the connection between stacked/overlapped layer traces.

The secondary convergence points (105), produce an effect similar to the auxiliary convergence points (104) once the concept is the same, however, in this point, and once it is a flow turning point, current flows (205, 206) will remain in receiver coil B (3), and current flows (203, 204) will remain in receiver coil A (2) being transformed in current flows (201, 202).

As it can be observed in FIG. 3, in a possible embodiment of the proposed inductive sensor, and accordingly with the proposed layout, flow currents (205, 206) mainly course parallel along Duplicated Receiver coil A (22), and flow currents (201, 202) and flow currents (203, 204) also course along in a parallel manner along receiver coil A (2), being transposed in the secondary convergence point (105).

The main convergence point (106) comprises, in a possible proposed embodiment, three distinct convergence points (101, 102, 103) which allow to route and de-interlace the parallel traces to each other along at least four layers. Therefore, and based on FIGS. 4 to 7, convergence point A (101) is adapted to allow the communication between top layer and bottom layer, being the origin for the inducted current flow (204), that at this main convergence point (106) will depart on the bottom layer.

Convergence point B (102), also ensures the connection between the top and bottom layers, but the main feature is accomplished by the connection between intermediate layers one and three, horizontally displaced inside the multi-layered PCB. In this point (102), the flow current (202) will be transferred from layer three to layer one, being transformed in flow current (203).

Convergence point C (103), as in similar convergence points (101, 102) also ensures the connection between the top and bottom layers, but the main goal is to ensure the routing of the flow current (201) originating from intermediate layer two to the top layer of the PCB.

This main convergence point (106) is a serial connection point of the receiver coil A layers.

Auxiliary convergence points (104), beyond ensuring the induced connection between the top and bottom layers through a blind via, the main goal is to ensure the connection between double adjacent traces located in layers two and three, with double adjacent layers located in layers one and four.

Secondary convergence point (105), in terms of layout, is composed by two opposite auxiliary convergence points (104), with the main difference residing in the fact that in the auxiliary convergence points (104) the route traces between layers are disposed in a nearly straight line, whereas in secondary convergence point (105) the routes traces between layers are disposed in an edge shaped connection forming an independent cross shaped connection.

Figure 1:
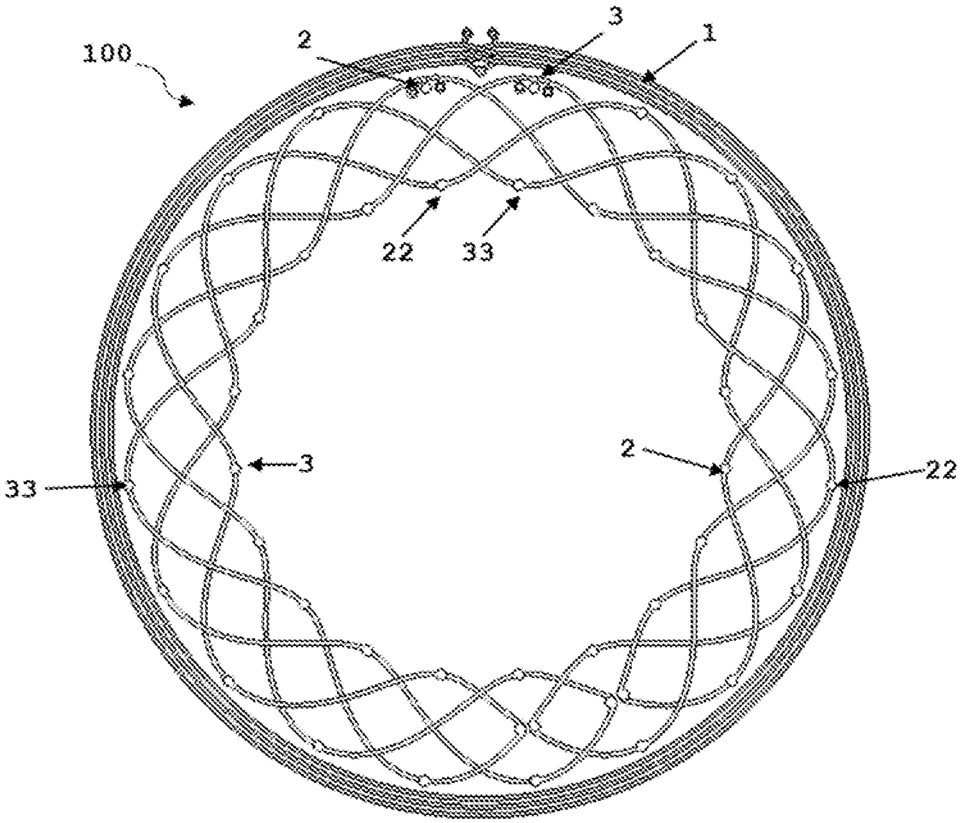
FIG. 1—represents a top view of the proposed inductive position sensor with two duplicated receiver coils in a 5-fold symmetry. Reference numbers represent.

Still with regard to FIGS. 1 and 2, the interlacing of the receiver coil A (2, 22), and/or receiver coil B (3, 33), results, in a non-limiting embodiment, in a flower-like shape where the excitation coil (1), displaced also in four layers, circularly surrounds the limits defined by the receiver coils (2, 3).

FIGS. 8 and 9 disclose further possible embodiments of the proposed arrangement. FIG. 8 discloses also a round inductive sensor (100) comprising an round excitation coil (1) with multiple traces arranged within multiple layers, wherein the excitation coils (2, 3) use the same via arrangement proposed in main convergence point (106), secondary convergence point (105) and auxiliary convergence point (104).

FIG. 9 shows another possible arrangement for the inductive sensor (100), this time in a non-limiting shape rectangular excitation coil (1) with multiple traces arranged within multiple layers, wherein the excitation coils (2, 3) use the same via arrangement proposed in main convergence point (106), secondary convergence point (105) and auxiliary convergence point (104).

The invention claimed is:

1. An inductive positioning sensor (100), arranged in a multi-layer printed circuit board, comprising at least one excitation coil (1); and at least one receiver coil system, comprising a receiver coil (2) and a corresponding duplicated receiver coil (22) arranged on different overlapped layers;

wherein the receiver coil (2) and the corresponding duplicated receiver coil (22) are connected in series at a main convergence point (106) comprising first, second, and third convergence points (101, 102, 103) formed by a single connection point arrangement of three through-hole vias;

wherein the multi-layer printed circuit board comprises traces in at least four overlapped layers and a trace layout comprising at least two stacked traces in different overlapped layers;

wherein the first, second, and third convergence points (101, 102, 103) are adapted to route and de-interlace the stacked traces between each other along the at least four overlapped layers of the multi-layer printed circuit board;

wherein the multi-layer printed circuit board comprises at least one blind via (104) configured to connect stacked/overlapped traces between adjacent layers of the multilayer printed circuit board; and wherein the multi-layer printed circuit board comprises a secondary convergence point (105) comprising two opposite blind vias (104) arranged such that routed traces between the adjacent layers are disposed in an edge shaped connection forming an independent cross shaped connection between the stacked traces.

2. The inductive positioning sensor (100) according to claim 1, wherein the at least one excitation coil (1) circularly surrounds the limits defined by the at least one receiver coil system.

3. The inductive positioning sensor (100) according to claim 1, wherein the first convergence point (101) comprises a through-hole via connection between the at least four overlapped layers of the multi-layer printed circuit board, said via being adapted to allow the trace communication between top layer and bottom layer.

4. The inductive positioning sensor (100) according to claim 1, wherein the second convergence point (102) comprises a through-hole via connection between the at least four overlapped layers of the multi-layer printed circuit board, said via being adapted to allow the trace communication between top layer, bottom layer, and between intermediate layer one and layer three.

5. The inductive positioning sensor (100) according to claim 1, wherein the third convergence point (103) comprises a through-hole via connection between the at least four overlapped layers of the multi-layer printed circuit board, said via being adapted to allow the trace communication between top layer, bottom layer and intermediate layer two.

6. The inductive positioning sensor (100) according to claim 1, comprising at least one application-specific integrated circuit with at least two interlaced receiver coils connected per-channel.

7. The inductive positioning sensor (100) according to claim 1, wherein the at least one blind via (104) is an auxiliary convergence point (104) configured to bypass flow currents between adjacent traces that are horizontally arranged and vertically aligned to upper and lower traces, and vice versa.

8. The inductive positioning sensor (100) according to claim 1, wherein the secondary convergence point (105) is composed of two opposite auxiliary convergence points (104), and wherein route traces between the layers in the auxiliary convergence point (104) are disposed in a nearly straight line.

* * * * *